United States Patent
Hong

(10) Patent No.: US 11,387,923 B2
(45) Date of Patent: Jul. 12, 2022

(54) INFORMATION CONFIGURATION METHOD AND APPARATUS, METHOD AND APPARATUS FOR DETERMINING RECEIVED POWER, AND BASE STATION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 78 days.

(21) Appl. No.: 16/961,881

(22) PCT Filed: Jan. 22, 2018

(86) PCT No.: PCT/CN2018/073639
§ 371 (c)(1),
(2) Date: Jul. 13, 2020

(87) PCT Pub. No.: WO2019/140692
PCT Pub. Date: Jul. 25, 2019

(65) Prior Publication Data
US 2020/0366391 A1 Nov. 19, 2020

(51) Int. Cl.
*H04B 17/318* (2015.01)
*H04W 8/24* (2009.01)
*H04W 52/14* (2009.01)

(52) U.S. Cl.
CPC ......... *H04B 17/318* (2015.01); *H04W 8/245* (2013.01); *H04W 52/146* (2013.01)

(58) Field of Classification Search
CPC .. H04B 17/318; H04B 7/0408; H04B 1/1036; H04B 7/0857; H04W 8/245;
(Continued)

(56) References Cited

U.S. PATENT DOCUMENTS

2016/0044600 A1    2/2016  Kim et al.
2016/0183195 A1*   6/2016  Gao ............... H04W 52/325
                                                   455/522
(Continued)

FOREIGN PATENT DOCUMENTS

CN    102244923 A    11/2011
CN    104349443 A    2/2015
(Continued)

OTHER PUBLICATIONS

State Intellectual Property Office of the People's Republic of China, Office Action and Search Report Issued in Application No. 201880000033.2, dated Jul. 13, 2021, 24 pages.
(Continued)

*Primary Examiner* — Ayaz R Sheikh
*Assistant Examiner* — Louis Samara
(74) *Attorney, Agent, or Firm* — Finnegan, Henderson, Farabow, Garrett & Dunner, L.L.P.

(57) ABSTRACT

The present disclosure relates to an information configuration method and an information configuration apparatus, a method and an apparatus for determining received power, a base station, a narrowband Internet of Things device, and a computer-readable storage medium. The information configuration method includes: configuring a higher layer filter coefficient value for a narrowband Internet of Things device accessing a current network; and sending the higher layer filter coefficient value to the narrowband Internet of Things device. In an example of the present disclosure, by configuring the higher layer filter coefficient value for the narrowband Internet of Things device accessing the current network, and sending the higher layer filter coefficient value to the narrowband Internet of Things device, the narrowband Internet of Things device can determine the current higher
(Continued)

Configure a higher layer filter coefficient value for an NB-IoT device accessing a current network — S101

Send the higher layer filter coefficient value to the NB-IoT device — S102 layer filtered narrowband Reference Signal Received Power based on the higher layer filter coefficient value.

12 Claims, 5 Drawing Sheets

(58) Field of Classification Search
CPC .......... H04W 52/146; H04W 74/0833; H04W 52/367; H04W 52/325
See application file for complete search history.

(56) References Cited

U.S. PATENT DOCUMENTS

| | | |
|---|---|---|
| 2017/0150457 A1 | 5/2017 | Kim et al. |
| 2017/0170982 A1* | 6/2017 | Rahman ............... H04B 1/1036 |
| 2018/0249362 A1 | 8/2018 | Kim et al. |
| 2019/0342812 A1* | 11/2019 | Yu ..................... H04W 52/0245 |
| 2019/0373563 A1* | 12/2019 | Gong ................... H04B 17/327 |
| 2020/0007195 A1* | 1/2020 | Yiu ....................... H04B 7/0857 |
| 2020/0163120 A1* | 5/2020 | Li .......................... H04W 16/26 |
| 2020/0314760 A1* | 10/2020 | Ye .......................... H04W 52/10 |

FOREIGN PATENT DOCUMENTS

| | | |
|---|---|---|
| CN | 105191448 A | 12/2015 |
| CN | 108235797 A | 6/2018 |
| CN | 108401535 A | 8/2018 |
| WO | WO-2017121199 A1 * | 7/2017 ........ H04W 36/0033 |

OTHER PUBLICATIONS

3GPP TS 36.213 V13.8.0 (Dec. 2017), 3rd Generation Partnership Project; Technical Specification Group Radio Access Network; Evolved Universal Terrestrial Radio Access (E-UTRA); Physical layer procedures (Release 13), Dec. 2017, 391 pages.
3GPP TS 36.331 V13.7.1 (Sep. 2017), 3rd Generation Partnership Project; Technical Specification Group Radio Access Network; Evolved Universal Terrestrial Radio Access (E-UTRA); Radio Resource Control (RRC); Protocol specification (Release 13), Sep. 2017, 642 pages.
International Search Report of PCT Application No. PCT/CN2018/073639 from the State Intellectual Property Office of the P.R. China, Beijing, China, dated Oct. 22, 2018.
ZTE, *UL power control for NB-IoT*, 3GPP TSG RAN WG1 NB-IoT Ad Hoc Meeting, Sophia Antipolis, France, Mar. 22-24, 2016, 4 pgs.
Written Opinion of the International Searching Authority Issued in Application No. PCT/CN2018/073639, dated Oct. 22, 2018, WIPO, 11 pages.
ZTE, "Clarification on nrs-Power related description", 3GPP TSG RAN WG1 Meeting #86bis, Lisbon, Portugal, R1-1609827, Oct. 10-14, 2016, 3 pages.

* cited by examiner

INFORMATION CONFIGURATION METHOD AND APPARATUS, METHOD AND APPARATUS FOR DETERMINING RECEIVED POWER, AND BASE STATION

CROSS REFERENCE TO RELATED APPLICATIONS

This application is a national phase application based on International Application No. PCT/CN2018/073639, filed Jan. 22, 2018, the content of which is incorporated herein by reference.

TECHNICAL FIELD

The present disclosure relates to the field of communication technologies, and in particular, to an information configuration method and an information configuration apparatus, a method and an apparatus for determining received power, a base station, a narrowband Internet of Things device, and a computer-readable storage medium.

BACKGROUND

With rapid development of communication technologies, mobile communication has experienced a rapid development from voice services to mobile bandwidth data services, which not only profoundly changed people's lifestyles, but also greatly promoted social and economic development. As the two main driving forces for the future development of mobile communication, the mobile Internet and the Internet of Things provide a broad application scenario for the fifth generation mobile communication technology (5th Generation, referred to as 5G for short). Facing year 2020 and the future, a thousand-fold increase in data traffic, hundreds of billions of device connections and diversified business requirements will pose severe challenges to the design of 5G systems. 5G will meet people's needs for ultra-high traffic density, ultra-high connection number density, and ultra-high mobility, and can provide users with the ultimate business experience of high-definition video, virtual reality, augmented reality, cloud desktop, online games, and so on. 5G will penetrate into the Internet of Things and other fields, and deeply integrate with industrial facilities, medical instruments, transportation, and the like, to fully realize the "Internet of Everything" and effectively meet the needs of information services in vertical industries such as industry, medical treatment, and transportation.

In order to meet the requirements of 5G networks for large-scale connectivity, the 3rd Generation Partnership Project (3GPP for short) defines a narrowband Internet of Things (NB-IoT for short) technology in the Radio Access Network (RAN) and will evolve it in the subsequent standardization process.

In Long Term Evolution (LTE for short), when a user terminal performs uplink power control, it is necessary to adjust a transmission power of the user terminal based on a path loss between the user terminal and the base station. The user terminal obtains an estimation of the path loss by measuring a Reference Signal Received Power (RSRP for short) from the base station. In LTE, the path loss can be estimated based on a downlink reference signal transmission power provided by a higher layer of the user terminal and a result of higher layer filtering of the RSRP measured by the user terminal.

In LTE, based on the latest measurement result of a RSRP by the user terminal, the result of the previous higher layer filtering and a coefficient $\alpha$, the result of higher layer filtering of the RSRP can be calculated, where the coefficient $\alpha$ can be obtained by calculation based on a configuration message received from the base station.

For an LTE NB-IoT user, the user terminal also uses the higher layer filtered RSRP to estimate the path loss between the user terminal and the base station, where the higher layer filtered RSRP used when estimating the path loss is a measurement value of a higher layer filtered narrowband RSRP (higher layer filtered NRSRP).

However, 3GPP does not stipulate how to determine higher layer filtered NRSRP, so it is impossible to estimate the value of the path loss.

SUMMARY

In view of this, the present disclosure provides an information configuration method and an information configuration apparatus, a method and an apparatus for determining received power, a base station, an NB-IoT device, and a computer-readable storage medium, so that the NB-IoT device can determine the current higher layer filtered NRSRP based on the higher layer filter coefficient value.

According to a first aspect of the examples of the present disclosure, an information configuration method is provided, which is applied to a base station. The method includes:

configuring a higher layer filter coefficient value for a narrowband Internet of Things NB-IoT device accessing a current network; and sending the higher layer filter coefficient value to the NB-IoT device.

In an example, sending the higher layer filter coefficient value to the NB-IoT device includes:

sending the higher layer filter coefficient value to the NB-IoT device through radio resource control RRC signaling.

In an example, the RRC signaling includes narrowband uplink power control information added with the higher layer filter coefficient value.

According to a second aspect of the examples of the present disclosure, a method for determining received power is provided, which is applied to a narrowband Internet of Things NB-IoT device. The method includes:

receiving a higher layer filter coefficient value sent by a base station; and determining a current higher layer filtered narrowband Reference Signal Received Power NRSRP based on the higher layer filter coefficient value.

In an example, determining a current higher layer filtered NRSRP based on the higher layer filter coefficient value includes:

calculating a preset coefficient value based on the higher layer filter coefficient value; and determining the current higher layer filtered NRSRP based on the preset coefficient value, a current measured NRSRP and a previous higher layer filtered NRSRP.

In an example, the method further includes:

after the current higher layer filtered NRSRP is determined based on the higher layer filter coefficient value, determining a path loss value from the NB-IoT device to the base station based on the current higher layer filtered NRSRP and a narrowband reference signal power and a narrowband reference signal power offset anchor point from a higher layer of the NB-IoT device.

In an example, receiving the higher layer filter coefficient value sent by the base station includes:

receiving a radio resource control RRC signaling sent by the base station, and obtaining the higher layer filter coefficient value from the RRC signaling.

According to a third aspect of the examples of the present disclosure, an information configuration apparatus is provided, which is applied to a base station. The apparatus includes:

a configuring module configured to configure a higher layer filter coefficient value for a narrowband Internet of Things NB-IoT device accessing a current network; and a sending module configured to send the higher layer filter coefficient value configured by the configuring module to the NB-IoT device.

In an example, the sending module is configured to:

send the higher layer filter coefficient value to the NB-IoT device through radio resource control RRC signaling.

In an example, the RRC signaling includes narrowband uplink power control information added with the higher layer filter coefficient value.

According to a fourth aspect of the examples of the present disclosure, an apparatus for determining received power is provided, which is applied to a narrowband Internet of Things NB-IoT device. The apparatus includes:

a receiving module configured to receive a higher layer filter coefficient value sent by a base station; and a first determining module configured to determine a current higher layer filtered NRSRP based on the higher layer filter coefficient value received by the receiving module.

In an example, the first determining module includes:

a calculating submodule configured to calculate a preset coefficient value based on the higher layer filter coefficient value; and a determining submodule configured to determine the current higher layer filtered NRSRP based on the preset coefficient value calculated by the calculating submodule, current measured NRSRP, a previous higher layer filtered NRSRP.

In an example, the apparatus further includes:

a second determining module configured to, after the first determining module determines the current higher layer filtered NRSRP based on the higher layer filter coefficient value, determine a path loss value from the NB-IoT device to the base station based on the current higher layer filtered NRSRP and a narrowband reference signal power and a narrowband reference signal power offset anchor point from a higher layer of the NB-IoT device.

In an example, the receiving module is configured to:

receive a radio resource control, RRC, signaling sent by the base station, and obtain the higher layer filter coefficient value from the RRC signaling.

According to a fifth aspect of the examples of the present disclosure, a base station is provided, including:

a processor; and a memory for storing processor-executable instructions;

wherein the processor is configured to:

configure a higher layer filter coefficient value for a narrowband Internet of Things NB-IoT device accessing a current network; and send the higher layer filter coefficient value to the NB-IoT device.

According to a sixth aspect of the examples of the present disclosure, a narrowband Internet of Things NB-IoT device is provided, including:

a processor; and a memory for storing processor-executable instructions;

wherein the processor is configured to:

receive a higher layer filter coefficient value sent by a base station; and determine a current higher layer filtered NRSRP based on the higher layer filter coefficient value.

According to a seventh aspect of the examples of the present disclosure, a computer-readable storage medium having computer instructions stored thereon is provided, when the instructions are executed by a processor, the steps of the information configuration method described above are implemented.

According to an eighth aspect of the examples of the present disclosure, a computer-readable storage medium having computer instructions stored thereon is provided, when the instructions are executed by a processor, the steps of the method of determining received power described above are implemented.

The technical solutions provided by the examples of the present disclosure can include the following beneficial effects:

By configuring the higher layer filter coefficient value for the NB-IoT device accessing the current network and sending the higher layer filter coefficient value to the NB-IoT device, the NB-IoT device can determine the current higher layer filtered NRSRP based on the higher layer filter coefficient value.

By receiving the higher layer filter coefficient value sent by the base station, and determining the current higher layer filtered NRSRP based on the higher layer filter coefficient value, the determination of the current higher layer filtered NRSRP can be achieved.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
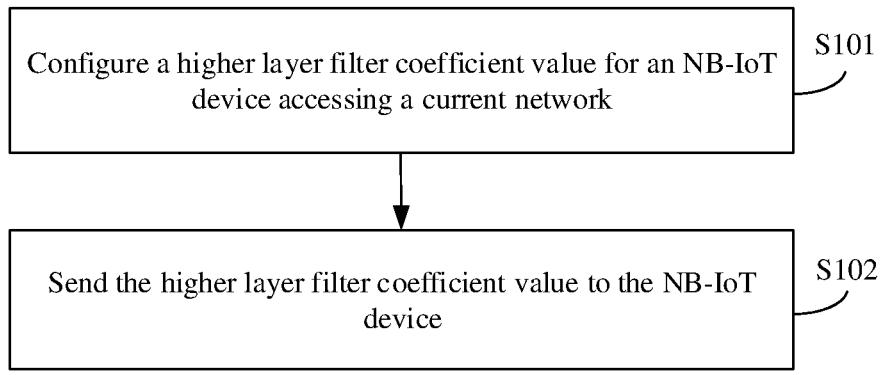
FIG. 1 is a flowchart illustrating an information configuration method according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating an information configuration method according to an example of the present disclosure. This example is described from a perspective of a base station. As shown in FIG. 1, the information configuration method includes blocks S101-S102.

At block S101, a higher layer filter coefficient value is configured for an NB-IoT device accessing a current network.

After the NB-IoT device accesses the current network, the base station can configure a higher layer filter coefficient value for the NB-IoT device.

At block S102, the higher layer filter coefficient value is sent to the NB-IoT device.

The base station can send the higher layer filter coefficient value to the NB-IoT device through a radio resource control (RRC) signaling. The RRC signaling can be implemented by adding the higher layer filter coefficient value to the existing narrowband uplink power control information (UplinkPowerControl-NB), or by adding a new RRC signaling.

Adding the higher layer filter coefficient to UplinkPowerControl-NB can be shown as the bold part in the following code:

```
UplinkPowerControlDedicated-NB-r13 ::=SEQUENCE {
    p0-UE-NPUSCH-r13     INTEGER (-8..7),
    filterCoefficient    FilterCoefficient    DEFAULT fc4
}.
```

The higher layer filter coefficient value added in UplinkPowerControl-NB can be as shown in the following code:

```
FilterCoefficient ::=    ENUMERATED {
                         fc0, fc1, fc2, fc3, fc4, fc5,
                         fc6, fc7, fc8, fc9, fc11, fc13,
                         fc15, fc17, fc19, spare1, ...}.
```

That is, the higher layer filter coefficient value can be fc0, fc1, fc2, fc3, fc4, fc5, fc6, fc7, fc8, fc9, fc11, fc13, fc15, fc17, fc19, or spare1, etc.

In the above example, by configuring the higher layer filter coefficient value for the NB-IoT device accessing the current network and sending the higher layer filter coefficient value to the NB-IoT device, the NB-IoT device can determine a current higher layer filtered NRSRP based on the higher layer filter coefficient value.

Figure 2:
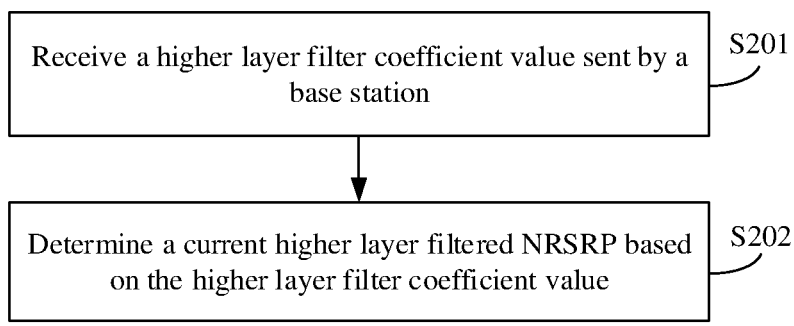
FIG. 2 is a flowchart illustrating a method for determining received power according to an example of the present disclosure.

FIG. 2 is a flowchart illustrating a method for determining received power according to an example of the present disclosure. This example is described from a perspective of the NB-IoT device. As shown in FIG. 2, the method for determining received power includes blocks S201-S202.

At block S201, a higher layer filter coefficient value sent by the base station is received.

The RRC signaling sent by the base station can be received, and the higher layer filter coefficient value can be obtained from the RRC signaling.

At block S202, a current higher layer filtered NRSRP is determined based on the higher layer filter coefficient value.

A preset coefficient value can be calculated based on the higher layer filter coefficient value, and based on the preset coefficient value, a current measured NRSRP and a previous higher layer filtered NRSRP, a current higher layer filtered NRSRP can be determined.

For example, the current higher layer filtered NRSRP can be calculated by the following formula:

$$F_n = (1-\alpha)F_{n-1} + \alpha M_n.$$

Where $F_n$ denotes the current higher layer filtered NRSRP, $\alpha = \frac{1}{2}(k/4)$, k denotes the higher layer filter coefficient value, $F_{n-1}$ denotes the previous higher layer filtered NRSRP, and $M_n$ denotes the current measured NRSRP.

In the above example, by receiving the higher layer filter coefficient value sent by the base station, and determining the current higher layer filtered NRSRP based on the higher layer filter coefficient value, the determination of the current higher layer filtered NRSRP can be achieved.

Figure 3:
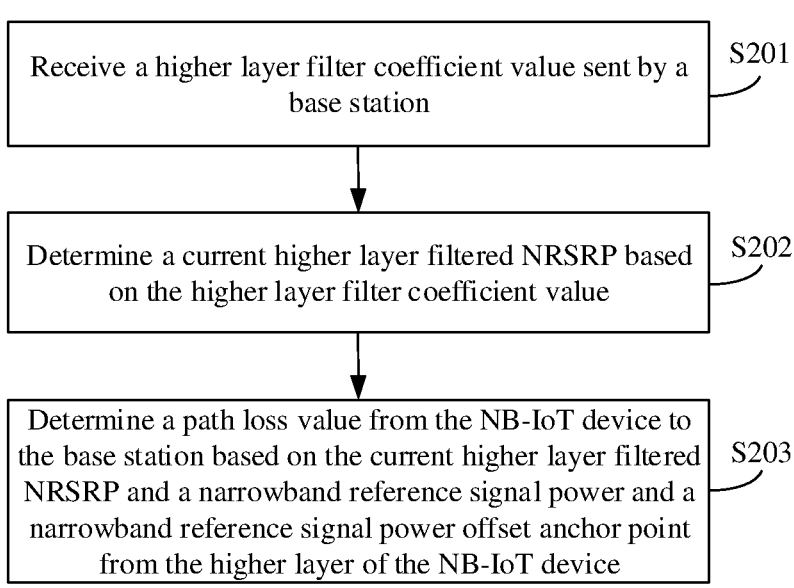
FIG. 3 is a flowchart illustrating another method for determining received power according to an example of the present disclosure.

FIG. 3 is a flowchart illustrating another method for determining received power according to an example of the present disclosure. As shown in FIG. 3, after the above block S202, the method for determining received power can further include block S203.

At block S203, a path loss value from the NB-IoT device to the base station is determined based on the current higher layer filtered NRSRP and a narrowband reference signal power and a narrowband reference signal power offset anchor point from the higher layer of the NB-IoT device.

The path loss value PLc can be calculated by the following formula:

$$PLc = nrs\text{-Power} + nrs\text{-PowerOffsetNonAnchor} - \text{higher layer filtered NRSRP}.$$

Where, nrs-Power denotes the narrowband reference signal power from the higher layer of the NB-IoT device, nrs-PowerOffsetNonAnchor denotes the narrowband reference signal power offset anchor point from the higher layer of the NB-IoT device, and higher layer filtered NRSRP is the current higher layer filtered NRSRP.

In the above example, by determining a path loss value from the NB-IoT device to the base station based on the current higher layer filtered NRSRP and a narrowband reference signal power and a narrowband reference signal power offset anchor point from the higher layer of the NB-IoT device, the NB-IoT device can achieve power control and it can improve the performance of NB-IoT device.

Figure 4:
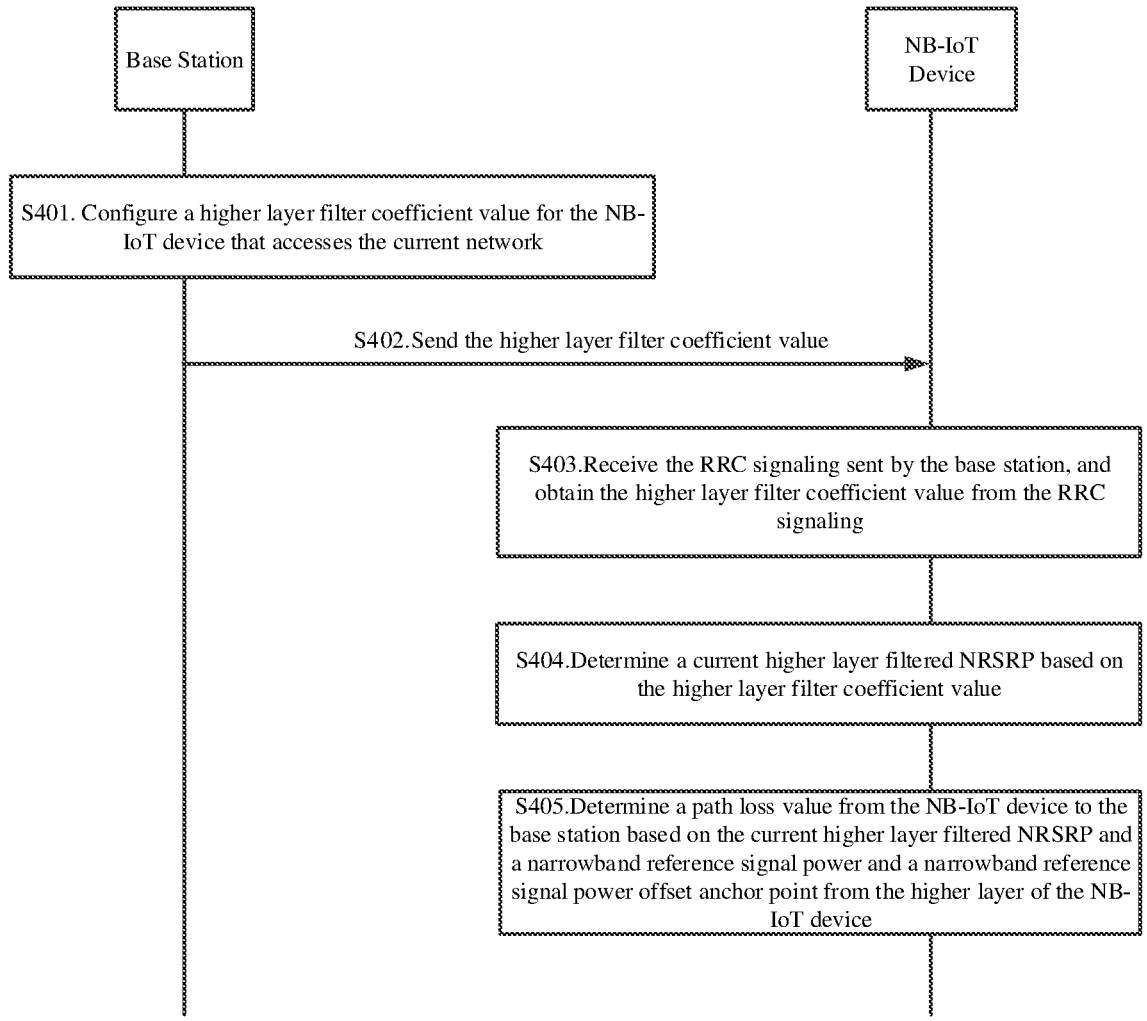
FIG. 4 is a signaling flowchart illustrating a method for determining received power according to an example of the present disclosure.

FIG. 4 is a signaling flowchart illustrating a method for determining received power according to an example of the present disclosure. This example is described from a perspective of interaction between a base station and an NB-IoT device. As shown in FIG. 4, the method for determining the received power includes blocks S401-S405.

At block S401, the base station configures a higher layer filter coefficient value for the NB-IoT device that accesses the current network.

At block S402, the base station sends the higher layer filter coefficient value to the NB-IoT device through RRC signaling.

At block S403, the NB-IoT device receives the RRC signaling sent by the base station, and obtains the higher layer filter coefficient value from the RRC signaling.

At block S404, the NB-IoT device determines a current higher layer filtered NRSRP based on the higher layer filter coefficient value.

At block S405, the NB-IoT device determines a path loss value from the NB-IoT device to the base station based on the current higher layer filtered NRSRP and a narrowband reference signal power and a narrowband reference signal power offset anchor point from the higher layer of the NB-IoT device.

In the above example, through the interaction between the base station and the NB-IoT device, the NB-IoT device can determine the current higher layer filtered NRSRP based on the higher layer filter coefficient value, and can determine a path loss value from the NB-IoT device to the base station based on the current higher layer filtered NRSRP and a narrowband reference signal power and a narrowband reference signal power offset anchor point from the higher layer of the NB-IoT device. Thereby, the NB-IoT device can achieve power control to improve the performance of NB-IoT device.

Figure 5:
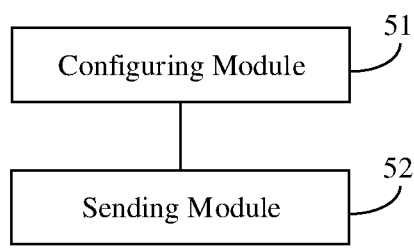
FIG. 5 is a block diagram illustrating an information configuration apparatus according to an example.

FIG. 5 is a block diagram illustrating an information configuration apparatus according to an example. The apparatus can be applied to a base station. As shown in FIG. 5, the apparatus includes a configuring module 51 and a sending module 52.

The configuring module 51 is configured to configure a higher layer filter coefficient value for an NB-IoT device accessing a current network.

After the NB-IoT device accesses the current network, the base station can configure a higher layer filter coefficient value for the NB-IoT device.

The sending module 52 is configured to send the higher layer filter coefficient value configured by the configuring module 51 to the NB-IoT device.

The sending module 52 can be configured to send the higher layer filter coefficient values to the NB-IoT device through RRC signaling.

The RRC signaling can be implemented by adding the higher layer filter coefficient value to the existing narrowband uplink power control information (UplinkPowerControl-NB), or by adding a new RRC signaling.

Adding the higher layer filter coefficient to UplinkPowerControl-NB can be shown as the bold part in the following code:

```
UplinkPowerControlDedicated-NB-r13 ::=SEQUENCE {
    p0-UE-NPUSCH-r13        INTEGER (-8..7),
    filterCoefficient       FilterCoefficient       DEFAULT fc4
}.
```

The higher layer filter coefficient value added in UplinkPowerControl-NB can be as shown in the following code:

```
FilterCoefficient ::=   ENUMERATED {
                        fc0, fc0, fc2, fc3, fc4, fc5,
                        fc6, fc7, fc8, fc9, fc11, fc13,
                        fc15, fc17, fc19, spare1, ...}.
```

That is, the higher layer filter coefficient value can be fc0, fc1, fc2, fc3, fc4, fc5, fc6, fc7, fc8, fc9, fc11, fc13, fc15, fc17, fc19, or spare1, etc.

In the above example, by configuring the higher layer filter coefficient value for the NB-IoT device accessing the current network, and sending the higher layer filter coefficient value to the NB-IoT device, the NB-IoT device can determine the current higher layer filtered NRSRP based on the higher layer filter coefficient value.

Figure 6:
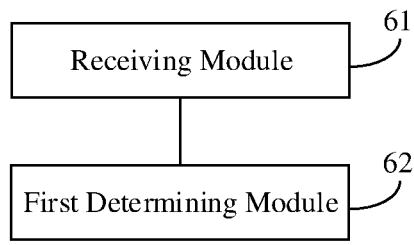
FIG. 6 is a block diagram illustrating an apparatus for determining received power according to an example.

FIG. 6 is a block diagram illustrating an apparatus for determining received power according to an example. The apparatus can be applied to an NB-IoT device. As shown in FIG. 6, the apparatus includes a receiving module 61 and a first determining module 62.

The receiving module 61 is configured to receive a higher layer filter coefficient value sent by the base station.

The receiving module 61 can be configured to: receive radio resource control RRC signaling sent by the base station, and obtain the higher layer filter coefficient value from the RRC signaling.

The first determining module 62 is configured to determine a current higher layer filtered NRSRP based on the higher layer filter coefficient value received by the receiving module 61.

In the above example, by receiving the higher layer filter coefficient value sent by the base station, and determining the current higher layer filtered NRSRP based on the higher layer filter coefficient value, the determination of the current higher layer filtered NRSRP can be achieved.

Figure 7:
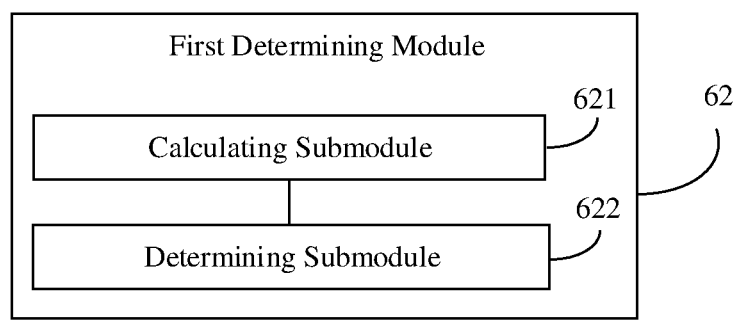
FIG. 7 is a block diagram illustrating another apparatus for determining received power according to an example.

FIG. 7 is a block diagram illustrating another apparatus for determining received power according to an example. As shown in FIG. 7, on the basis of the example shown in FIG. 6, the first determining module 62 can include: a calculating submodule 621 and a determining submodule 622.

The calculating submodule 621 is configured to calculate a preset coefficient value based on the higher layer filter coefficient value.

The determining submodule 622 is configured to determine the current higher layer filtered NRSRP based on the preset coefficient value calculated by the calculating submodule 621, the current measured NRSRP and the previous higher layer filtered NRSRP.

A preset coefficient value can be calculated based on the higher layer filter coefficient value, and based on the preset coefficient value, the current measured NRSRP and the previous higher layer filtered NRSRP, the current higher layer filtered NRSRP can be determined.

For example, the current higher layer filtered NRSRP can be calculated by the following formula:

$$F_n = (1-\alpha)F_{n-1} + \alpha M_n.$$

Where $F_n$ denotes the current higher layer filtered NRSRP, $\alpha = \frac{1}{2}(k/4)$, k denotes the higher layer filter coefficient value, $F_{n-1}$ denotes the previous higher layer filtered NRSRP, and $M_n$ denotes the current measured NRSRP.

In the above example, by receiving the higher layer filter coefficient value sent by the base station, and determining the current higher layer filtered NRSRP based on the higher layer filter coefficient value, the determination of the current higher layer filtered NRSRP can be achieved.

Figure 8:
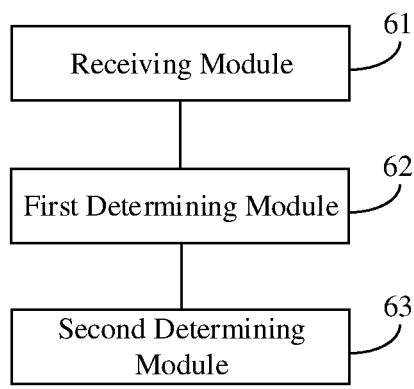
FIG. 8 is a block diagram illustrating another apparatus for determining received power according to an example.

FIG. 8 is a block diagram illustrating another apparatus for determining received power according to an example. As shown in FIG. 8, based on the example shown in FIG. 6, the apparatus can further include: a second determining module 63.

The second determining module 63 is configured to, after the first determining module 62 determines the current higher layer filtered NRSRP based on the higher layer filter coefficient value, determine a path loss value from the NB-IoT device to the base station based on the current higher layer filtered NRSRP and a narrowband reference signal power and a narrowband reference signal power offset anchor point from the higher layer of the NB-IoT device.

The path loss value PLc can be calculated by the following formula:

$$PLc = nrs\text{-Power} + nrs\text{-PowerOffsetNonAnchor} - \text{higher layer filtered NRSRP}.$$

Where, nrs-Power denotes the narrowband reference signal power from the higher layer of the NB-IoT device, nrs-PowerOffsetNonAnchor denotes the narrowband reference signal power offset anchor point from the higher layer of the NB-IoT device, and higher layer filtered NRSRP is the current higher layer filtered NRSRP.

In the above example, by determining a path loss value from the NB-IoT device to the base station based on the current higher layer filtered NRSRP and a narrowband reference signal power and a narrowband reference signal power offset anchor point from the higher layer of the NB-IoT device, the NB-IoT device can achieve power control and it can improve the performance of NB-IoT device.

Figure 9:
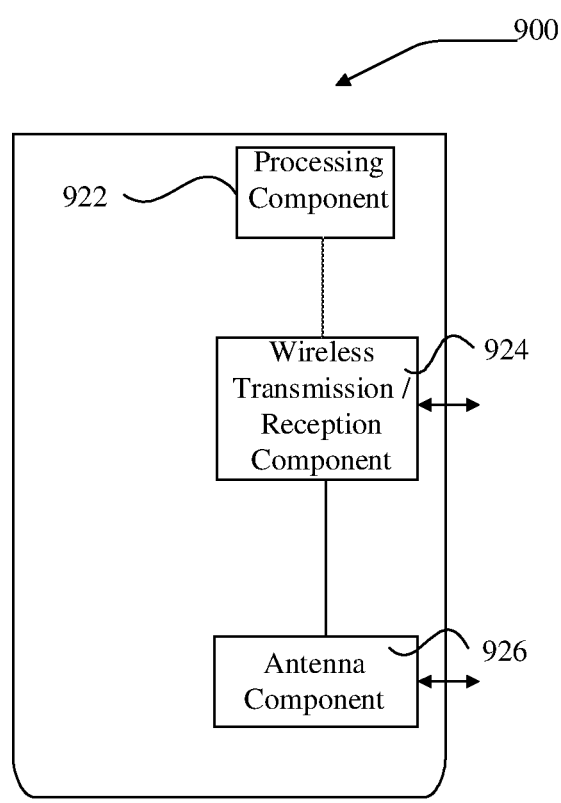
FIG. 9 is a block diagram illustrating an information configuration apparatus according to an example.

FIG. 9 is a block diagram illustrating an apparatus suitable for information configuration according to an example. The apparatus 900 can be provided as a base station. Referring to FIG. 9, the apparatus 900 includes a processing component 922, a wireless transmission/reception component 924, an antenna component 926, and a signal processing part unique to a wireless interface. The processing component 922 can further include one or more processors.

One of the processors in the processing component 922 can be configured to:

configure a higher layer filter coefficient value for an NB-IoT device accessing a current network; and send the higher layer filter coefficient value to the NB-IoT device.

In an example, a non-transitory computer-readable storage medium including instructions is provided, the instructions can be executed by the processing component 922 of the apparatus 900 to complete the information configuration method. For example, the non-transitory computer-readable storage medium can be a ROM, a random access memory (RAM), a CD-ROM, a magnetic tape, a floppy disk, an optical data storage device, or the like.

Figure 10:
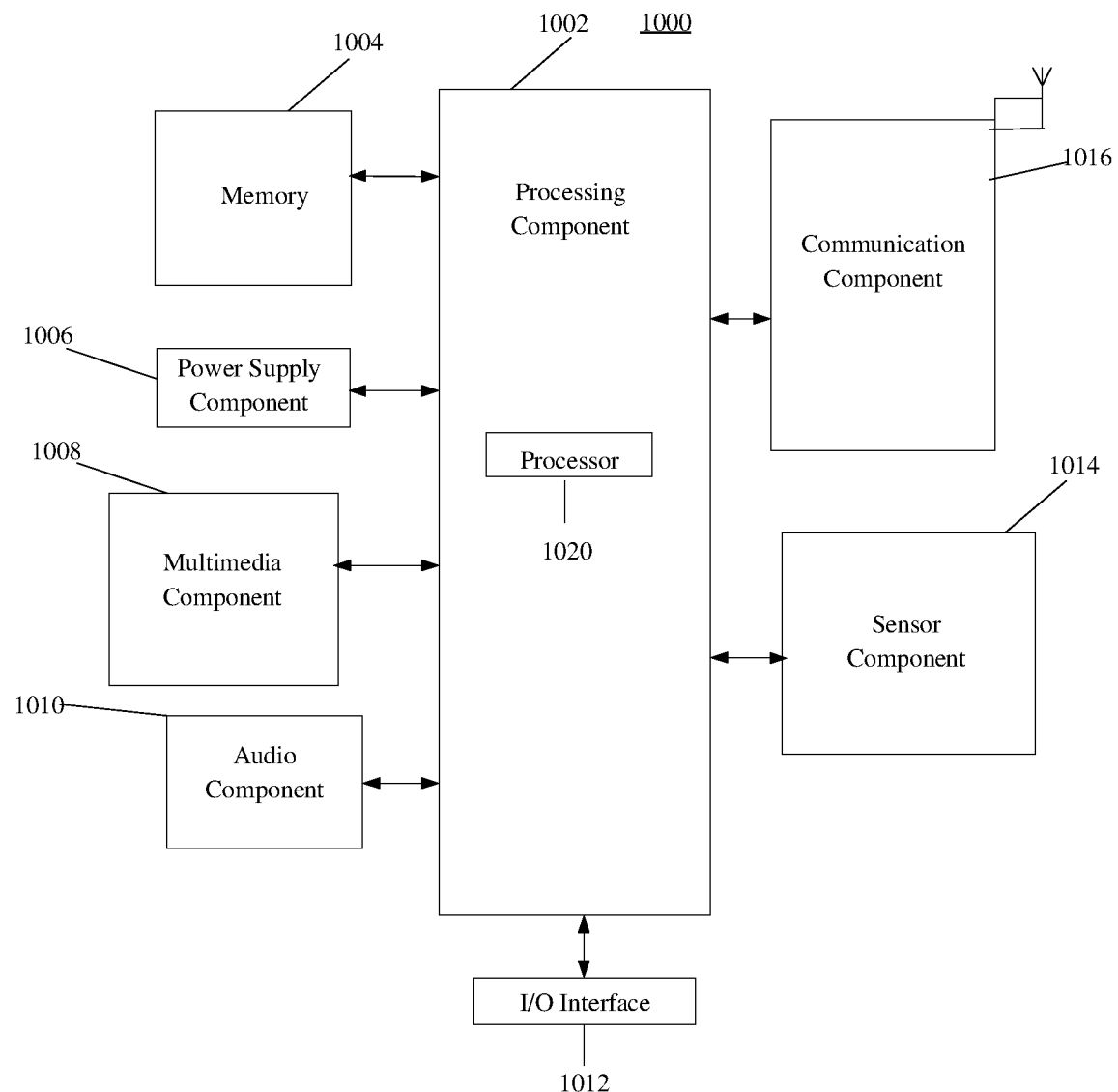
FIG. 10 is a block diagram illustrating an apparatus for determining received power according to an example.

FIG. 10 is a block diagram illustrating an apparatus for determining received power according to an example. For example, the apparatus 1000 can be an NB-IoT device such as a mobile phone, a computer, a digital broadcasting terminal, a messaging device, a game console, a tablet device, a medical device, fitness equipment, a personal digital assistant, or the like.

As shown in FIG. 10, the apparatus 1000 can include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls overall operations of the apparatus 1000, such as operations associated with display, phone calls, data communications, camera operations, and recording operations. The processing component 1002 can include one or more processors 1020 to execute instructions to complete all or part of the blocks of the above methods. In addition, the processing component 1002 can include one or more modules which facilitate the interaction between the processing component 1002 and other components. For example, the processing component 1002 can include a multimedia module to facilitate the interaction between the multimedia component 1008 and the processing component 1002.

One processor 1020 in the processing component 1002 can be configured to:

receive a higher layer filter coefficient value sent by the base station; and determine a current higher layer filtered NRSRP based on the higher layer filter coefficient value.

The memory 1004 is configured to store various types of data to support the operation of the apparatus 1000. Examples of such data include instructions for any application or method operated on the apparatus 1000, contact data, phonebook data, messages, pictures, videos, and so on. The memory 1004 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1006 supplies power for different components of the apparatus 1000. The power supply component 1006 can include a power supply management system, one or more power supplies, and other components associated with generating, managing and distributing power for the apparatus 1000.

The multimedia component 1008 includes a screen providing an output interface between the apparatus 1000 and a user. In some examples, the screen can include a Liquid Crystal Display (LCD) and a Touch Panel (TP). If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense a duration and a pressure associated with the touch or swipe. In some examples, the multimedia component 1008 can include a front camera and/or a rear camera. The front camera and/or rear camera can receive external multimedia data when the apparatus 1000 is in an operating mode, such as a photographing mode or a video mode. Each of the front camera and the rear camera can be a fixed optical lens system or have focal length and optical zooming capability.

The audio component 1010 is configured to output and/or input an audio signal. For example, the audio component 1010 includes a microphone (MIC). When the apparatus 1000 is in an operating mode, such as a call mode, a record mode and a voice recognition mode, the microphone is configured to receive an external audio signal. The received audio signal can be further stored in the memory 1004 or sent via the communication component 1016. In some examples, the audio component 1010 further includes a speaker for outputting an audio signal.

The I/O interface 1012 provides an interface between the processing component 1002 and a peripheral interface module. The above peripheral interface module can be a keyboard, a click wheel, buttons, or the like. These buttons can include but not limited to, a home button, a volume button, a start button and a lock button.

The sensor component 1014 includes one or more sensors to provide status assessments of various aspects for the apparatus 1000. For example, the sensor component 1014 can detect the on/off status of the apparatus 1000, and relative positioning of component, for example, the component is a display and a keypad of the apparatus 1000. The sensor component 1014 can also detect a change in position of the apparatus 1000 or a component of the apparatus 1000, a presence or absence of the contact between a user and the apparatus 1000, an orientation or an acceleration/deceleration of the apparatus 1000, and a change in temperature of the apparatus 1000. The sensor component 1014 can include a proximity sensor configured to detect the presence of a nearby object without any physical contact. The sensor component 1014 can further include an optical sensor, such as a Complementary Metal-Oxide-Semiconductor (CMOS) or Charged Coupled Device (CCD) image sensor which is used in imaging applications. In some examples, the sensor component 1014 can further include an acceleration sensor, a gyroscope sensor, a magnetic sensor, a pressure sensor, or a temperature sensor.

The communication component 1016 is configured to facilitate wired or wireless communication between the apparatus 1000 and other devices. The apparatus 1000 can access a wireless network based on a communication standard, such as Wi-Fi, 2G or 3G, or a combination thereof. In an example, the communication component 1016 receives a broadcast signal or broadcast related information from an external broadcast management system via a broadcast channel In an example, the communication component 1016 can further include a Near Field Communication (NFC) module for promoting short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an example, the apparatus 1000 can be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, a non-transitory computer readable storage medium including instructions is further provided, such as the memory 1004 including instructions. The above instructions can be executed by the processor 1020 of the apparatus 1000 to complete the above method. For example, the non-transitory computer readable storage medium can be a Read-Only Memory (ROM), a Random Access Memory (RAM), a CD-ROM, a magnetic tape, a floppy disk, an optical data storage device, and so on.

Since the apparatus examples substantially correspond to the method examples, a reference can be made to part of the descriptions of the method examples for the related part. The apparatus examples described above are merely illustrative, where the units described as separate members can be or not be physically separated, and the members displayed as units can be or not be physical units, i.e., can be located in one place, or can be distributed to a plurality of network units. Part or all of the modules can be selected based on actual requirements to implement the objectives of the solutions in the examples. Those of ordinary skill in the art can understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the element.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

The invention claimed is:

1. An information configuration method, applied to a base station, the method comprising:
   configuring a higher layer filter coefficient value for a narrowband Internet of Things device accessing a current network; and
   sending the higher layer filter coefficient value to the narrowband Internet of Things device, wherein the narrowband Internet of Thing device performs:
      receiving the higher layer filter coefficient value sent by the base station; and
      determining a current higher layer filtered narrowband Reference Signal Received Power based on the higher layer filter coefficient value, wherein the determining comprises:
         calculating a preset coefficient value based on the higher layer filter coefficient value; and
         determining the current higher layer filtered narrowband Reference Signal Received Power based on the preset coefficient value, a current measured narrowband Reference Signal Received Power, and a previous higher layer filtered narrowband Reference Signal Received Power.

2. The method according to claim 1, wherein sending the higher layer filter coefficient value to the narrowband Internet of Things device comprises:
   sending the higher layer filter coefficient value to the narrowband Internet of Things device through radio resource control (RRC) signaling.

3. The method according to claim 2, wherein the RRC signaling comprises narrowband uplink power control information added with the higher layer filter coefficient value.

4. A method of determining received power, applied to a narrowband Internet of Things device, the method comprising:
   receiving a higher layer filter coefficient value sent by a base station; and
   determining a current higher layer filtered narrowband Reference Signal Received Power based on the higher layer filter coefficient value, wherein the determining comprises:
      calculating a preset coefficient value based on the higher layer filter coefficient value; and determining the current higher layer filtered narrowband Reference Signal Received Power based on the preset coefficient value, a current measured narrowband Reference Signal Received Power, and a previous higher layer filtered narrowband Reference Signal Received Power.

5. The method according to claim 4, wherein the method further comprises:
after the current higher layer filtered narrowband Reference Signal Received Power is determined based on the higher layer filter coefficient value, determining a path loss value from the narrowband Internet of Things device to the base station based on the current higher layer filtered narrowband Reference Signal Received Power, and a narrowband reference signal power and a narrowband reference signal power offset anchor point from a higher layer of the narrowband Internet of Things device.

6. The method according to claim 4, wherein receiving the higher layer filter coefficient value sent by the base station comprises:
receiving a radio resource control (RRC) signaling sent by the base station, and obtaining the higher layer filter coefficient value from the RRC signaling.

7. A base station, comprising:
a processor; and
a memory for storing processor-executable instructions;
wherein the processor is configured to:
configure a higher layer filter coefficient value for a narrowband Internet of Things device accessing a current network; and
send the higher layer filter coefficient value to the narrowband Internet of Things device, wherein the narrowband Internet of Thing device performs:
receiving the higher layer filter coefficient value sent by the base station; and
determining a current higher layer filtered narrowband Reference Signal Received Power based on the higher layer filter coefficient value, wherein the determining comprises:
calculating a preset coefficient value based on the higher layer filter coefficient value; and
determining the current higher layer filtered narrowband Reference Signal Received Power based on the preset coefficient value, a current measured narrowband Reference Signal Received Power, and a previous higher layer filtered narrowband Reference Signal Received Power.

8. The base station according to claim 7, wherein in sending the higher layer filter coefficient value to the narrowband Internet of Things device, the processor is further configured to:
send the higher layer filter coefficient value to the narrowband Internet of Things device through radio resource control (RRC) signaling.

9. The base station according to claim 8, wherein the RRC signaling comprises narrowband uplink power control information added with the higher layer filter coefficient value.

10. A narrowband Internet of Things device, comprising:
a processor; and
a memory for storing processor-executable instructions;
wherein the processor is configured to:
receive a higher layer filter coefficient value sent by a base station; and
determine a current higher layer filtered narrowband Reference Signal Received Power based on the higher layer filter coefficient value, wherein in determining the current higher layer filtered narrowband Reference Signal Received Power based on the higher layer filter coefficient value, the processor is further configured to:
calculate a preset coefficient value based on the higher layer filter coefficient value; and
determine the current higher layer filtered narrowband Reference Signal Received Power based on the preset coefficient value, a current measured narrowband Reference Signal Received Power, and a previous higher layer filtered narrowband Reference Signal Received Power.

11. The narrowband Internet of Things device according to claim 10, wherein the processor is further configured to:
after the current higher layer filtered narrowband Reference Signal Received Power is determined based on the higher layer filter coefficient value, determine a path loss value from the narrowband Internet of Things device to the base station based on the current higher layer filtered narrowband Reference Signal Received Power, and a narrowband reference signal power and a narrowband reference signal power offset anchor point from a higher layer of the narrowband Internet of Things device.

12. The narrowband Internet of Things device according to claim 10, wherein in receiving the higher layer filter coefficient value sent by the base station, the processor is further configured to:
receive a radio resource control (RRC) signaling sent by the base station, and obtain the higher layer filter coefficient value from the RRC signaling.

* * * * *